US008442344B2

(12) United States Patent
Jiang et al.

(10) Patent No.: US 8,442,344 B2
(45) Date of Patent: May 14, 2013

(54) ADAPTIVE SPATIAL IMAGE FILTER FOR FILTERING IMAGE INFORMATION

(75) Inventors: Xiaoyun Jiang, San Diego, CA (US); Chinchuan Andrew Chiu, San Diego, CA (US); Dennis Liu, San Diego, CA (US); Victor H. Chan, Encinitas, CA (US); Xin Zhong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 799 days.

(21) Appl. No.: 11/500,768

(22) Filed: Aug. 7, 2006

(65) Prior Publication Data

US 2008/0031538 A1 Feb. 7, 2008

(51) Int. Cl.
| G06K 9/00 | (2006.01) |
| G06K 9/46 | (2006.01) |
| G06K 9/66 | (2006.01) |
| G06K 9/40 | (2006.01) |
| G06K 9/32 | (2006.01) |
| G06K 15/00 | (2006.01) |
| H04N 5/228 | (2006.01) |
| H04N 5/208 | (2006.01) |
| H04N 7/01 | (2006.01) |
| H04N 11/20 | (2006.01) |
| H04N 1/407 | (2006.01) |
| H04N 1/409 | (2006.01) |
| G06T 5/00 | (2006.01) |

(52) U.S. Cl.
USPC ........... 382/261; 382/162; 382/195; 382/254; 382/299; 358/3.27; 348/222.1; 348/252; 348/441

(58) Field of Classification Search .......... 382/254–258, 382/260–264, 266, 274–277, 293, 298–300, 382/162, 195, 268; 358/1.1, 1.2, 1.9, 2.1, 358/3.27, 525, 528, 531, 532, 448; 348/204.99–240.2, 252, 441
See application file for complete search history.

(56) References Cited

U.S. PATENT DOCUMENTS 5,696,850 A * 12/1997 Parulski et al. ............... 382/261
5,926,258 A * 7/1999 Mandl et al. .................... 355/71
(Continued)

FOREIGN PATENT DOCUMENTS

EP 1523181 4/2005
JP 2002344798 A 11/2002
(Continued)

OTHER PUBLICATIONS

International Search Report—PCT/US07/075098—International Search Authority—European Patent Office, Feb. 6, 2008.
(Continued)

Primary Examiner — Randolph I Chu
Assistant Examiner — Nathan Bloom
(74) Attorney, Agent, or Firm — James R. Gambale, Jr.

(57) ABSTRACT

The disclosure describes adaptive filtering techniques to improve the quality of captured image information, such as video or still images. An image sensor captures image information and determines a plurality of parameter values based on a current exposure index and a current scaling factor of the image information. The adaptive spatial image filter includes both horizontal and vertical sharpening filters and configures, i.e., adapts, the horizontal sharpening filter and the vertical sharpening filter based on the plurality of parameter values determined by the image sensor. The adaptive spatial image filter applies the horizontal and vertical sharpening filters to at one channel of the image information to generate filtered image information.

50 Claims, 8 Drawing Sheets

U.S. PATENT DOCUMENTS

| | | | | |
|---|---|---|---|---|
| 5,978,518 | A * | 11/1999 | Oliyide et al. | 382/260 |
| 5,982,923 | A * | 11/1999 | Kim et al. | 382/154 |
| 6,091,861 | A * | 7/2000 | Keyes et al. | 382/299 |
| 6,167,414 | A | 12/2000 | Schwartz | |
| 6,614,474 | B1 * | 9/2003 | Malkin et al. | 348/252 |
| 6,757,442 | B1 * | 6/2004 | Avinash | 382/274 |
| 6,924,839 | B2 * | 8/2005 | Eiho et al. | 348/252 |
| 7,031,549 | B2 * | 4/2006 | Luo | 382/264 |
| 7,167,601 | B2 * | 1/2007 | Kuramoto | 382/298 |
| 7,379,213 | B2 * | 5/2008 | Koizumi | 358/3.27 |
| 7,679,621 | B2 * | 3/2010 | Nishiyama et al. | 345/611 |
| 2003/0193584 | A1 * | 10/2003 | Malkin et al. | 348/252 |
| 2004/0051908 | A1 * | 3/2004 | Curry et al. | 358/3.08 |
| 2004/0091174 | A1 | 5/2004 | Wang et al. | |
| 2005/0074179 | A1 * | 4/2005 | Wilensky | 382/254 |
| 2005/0089239 | A1 * | 4/2005 | Brajovic | 382/266 |
| 2005/0089247 | A1 * | 4/2005 | Braun et al. | 382/298 |
| 2005/0123211 | A1 * | 6/2005 | Wong et al. | 382/254 |
| 2005/0135698 | A1 * | 6/2005 | Yatsenko et al. | 382/260 |
| 2005/0225781 | A1 * | 10/2005 | Koizumi | 358/1.9 |
| 2006/0017773 | A1 * | 1/2006 | Sheraizin et al. | 347/43 |
| 2006/0045375 | A1 * | 3/2006 | Okuno et al. | 382/266 |
| 2006/0050783 | A1 * | 3/2006 | Le Dinh et al. | 375/240.2 |
| 2006/0062484 | A1 * | 3/2006 | Aas et al. | 382/255 |
| 2006/0133689 | A1 * | 6/2006 | Andersson et al. | 382/261 |
| 2007/0165962 | A1 * | 7/2007 | Smirnov et al. | 382/260 |

FOREIGN PATENT DOCUMENTS

| | | |
|---|---|---|
| JP | 2003209686 | 7/2003 |
| JP | 2006050155 A | 2/2006 |

OTHER PUBLICATIONS

Written Opinion—PCT/US2007/075098, International Search Authority, European Patent Office, Feb. 6, 2008.

* cited by examiner

ADAPTIVE SPATIAL IMAGE FILTER FOR FILTERING IMAGE INFORMATION

TECHNICAL FIELD

The disclosure relates to image capture devices and, more particularly, filtering of image information within image capture devices.

BACKGROUND

Image information captured by image capture devices, such as digital still photo cameras, are susceptible to noise as a result of physical limitations of the image sensors, interference from illumination sources, and the like. With the increased demand for smaller image capture devices, e.g., in multi-purpose mobile devices such as mobile wireless communication devices, comes the need for more compact image sensor modules. The decrease in the size of image sensor modules results in a significant increase in the amount of noise captured within the image information.

Image information filtering is a common process used for removing or reducing noise, and improving the quality of a rendered image. Application of low pass filtering to captured image information reduces the amount of noise in the image, but also tends to blur the image by destroying sharp edges containing high frequency signals. Application of high pass filtering to captured image data enhances sharp edges and contrast, but inevitably enhances the noise as well.

SUMMARY

The disclosure describes adaptive filtering techniques to improve the quality of captured image information, such as video or still images. For example, an image capture device within a multi-purpose mobile device may employ adaptive filtering techniques to improve the quality of images captured by such a device. The disclosure describes adaptive filtering techniques that adapt to a current exposure level and a current scaling level associated with captured image information.

The image capture device may include an image sensor that captures the image information and an adaptive spatial image filter to improve the quality of the image information in accordance with the adaptive filtering techniques described in this disclosure. The adaptive spatial image filter uses a set of parameter values that are adjusted based on the current exposure index level and the current scaling factor level of the image information captured by the image sensor.

The adaptive spatial image filter includes both a horizontal sharpening filter and a vertical sharpening filter, which it applies to at least one channel of the captured image information. Each of the horizontal and vertical sharpening filters may comprise a low pass component and a high pass component, each of which may be configurable so as to reduce halo effects or residual white outlines around darkened edges resulting from application of the sharpening filters.

The adaptive spatial image filter may further refine the output from the horizontal and vertical sharpening filters by clamping and adjusting the horizontally and vertically sharpened image information. As a result of applying the adaptive spatial image filter to the captured image information, image information may be refined such that noise and other image anomalies are significantly reduced.

In one embodiment, the disclosure provides a method comprising determining one or more parameter values based on a current exposure level and a current scaling level of image information, configuring a horizontal sharpening filter based on the parameter values, configuring a vertical sharpening filter based on the parameter values, and applying the horizontal and vertical sharpening filters to at least one channel of the image information to generate filtered image information.

In another embodiment, the disclosure provides a device comprising an image sensor that captures image information, and an adaptive spatial image filter that includes horizontal and vertical sharpening filters, wherein the adaptive spatial image filter configures the horizontal sharpening filter and the vertical sharpening filter based on one or more parameter values that are based on a current exposure level and a current scaling level of the image information, and applies the horizontal and vertical sharpening filters to at least one channel of the image information to generate filtered image information.

The techniques described in this disclosure may be implemented in a hardware, software, firmware, or any combination thereof. If implemented in software, the software may be executed in a processor, such as a digital signal processor (DSP). The software that executes the techniques may be initially stored in a computer readable medium and loaded and executed in the processor. Accordingly, this disclosure also contemplates a computer readable medium comprising instructions to perform adaptive filtering techniques.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
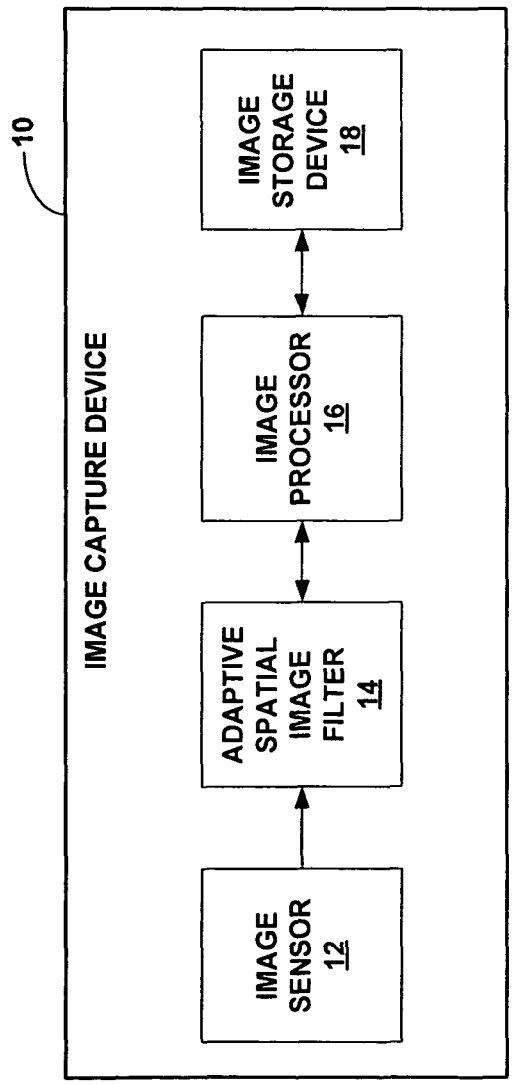
FIG. 1 is a block diagram illustrating an exemplary image capture device for capturing image information.

FIG. 1 is a block diagram illustrating an exemplary image capture device 10 for capturing image information. As shown in FIG. 1, image capture device 10 includes an image sensor 12, an adaptive spatial image filter 14, an image processor 16, and an image storage device 18. The features illustrated in FIG. 1 may be realized by any suitable combination of hardware and/or software components. Depiction of different features as units is intended to highlight different functional aspects of image capture device 10, and does not necessarily imply that such units must be realized by separate hardware and/or software components. Rather, functionality associated with one or more units may be integrated within common hardware and/or software components.

In an exemplary embodiment, adaptive spatial filter 14 may be based on a five-by-five (5×5) spatial filter that is applied to pixel values associated with image information obtained by image sensor 12. The 5×5 spatial filter provides a high pass filter in one dimension and a low pass filter in another dimension. This design of adaptive spatial filter 14 can provide efficiency and create a clear and clean sharpening effect even when edges are somewhat noisy, which is common for images obtained by small cameras due to lens and sensor quality. Adaptive spatial filter 14 may provide adjustable noise reduction control, horizontal and vertical sharpening degree control, and maximum sharpening effect control. In addition, the efficiency of the adaptive spatial filter can be controlled according to illumination light intensity, image size, and scaling factors. In particular, adaptive spatial filter 14 may adapt to a current exposure level and a current scaling level for image information obtained by image sensor 12.

Because adaptive spatial filter 14 helps reduce noise and sharpen edges, it may be provided as post-processing for images obtained by image sensor 12. In some embodiments, adaptive spatial filter 14 may be applied only to the luminance (Y) channel before image compression. Filter parameters may be generated at runtime based on conditions of an image captured by image sensor 12. The filter parameters are sent to the adaptive spatial filter 14, which processes the Y channel, and outputs spatially filtered Y signals to image processor 16. The filter Y channel may be compressed with the original CbCr channels, e.g., using JPEG compression. Different adaptive spatial filter parameters may be created according to different conditions, such as current exposure level and current scaling level. The current exposure level indicates a lighting condition, and the current scaling level indicates an image up-size or down-size ratio, i.e., a zoom factor. The adaptive spatial filter parameters generally include smoothing degree, sharpening degree, noise level and maximum sharpening level.

Image capture device 10 may be a digital camera, such as a digital video camera, a digital still image camera, or a combination of both. Image capture device 10 may be a stand-alone device, such as a stand-alone camera, or be integrated in another multi-purpose device, such as a wireless communication device. As an example, image capture device 10 may be integrated in a mobile telephone to form a so-called camera phone or video phone. Image capture device 10 preferably is equipped to capture color imagery, black-and-white imagery, or both. In this disclosure, the terms "image," "imagery," "image information," or similar terms may interchangeably refer to either video or still pictures.

Image sensor 12 acquires image information for a scene of interest. Image sensor 12 may include a two-dimensional array of individual image sensor elements, e.g., arranged in rows and columns. Each of the image sensor elements of image sensor 12 may be associated with a single pixel. In other words, there may be a one-to-one correspondence between image sensor elements and pixels. In some embodiments, however, there may be more than one image sensor element associated with each pixel. Image sensor 12 may comprise, for example, an array of solid state sensors such as complementary metal-oxide semiconductor (CMOS) sensors, charge coupled device (CCD) sensors or the like.

Image sensor 12 may also include a two-dimensional array of color filters that cover the image sensor elements to separate out the color components of the scene of interest. Image sensor 12 may comprise, for example, an array of red, green and blue filters arranged in a Bayer pattern, i.e., a repeating arrangement of color filters that alternates rows of alternating red and green color filters, and alternating blue and green color filters. Image sensor 12 may utilize other color filters, such as cyan, magenta, yellow and black (CMYK) color filters. Additionally, image sensor 12 may arrange the color filters into patterns other than the Bayer pattern.

The image sensor elements within image sensor 12 are exposed to the image scene to capture image information. Each of the image sensor elements of sensor 12 may, for example, capture an intensity value representing the intensity of the light of the scene at a particular pixel position. Each of the image sensors of sensor 12 may only be sensitive to one color, or color band, due to the color filters covering the sensors. Thus, each of the image sensors of sensor array 12 may capture image information (e.g., intensity values) for only one of three colors.

Typically, image sensor 12 also employs algorithms via hardware, software, or both that translate the captured color filtered image information into the luminance, chromatic blue, chromatic red (YCbCr) color space. Image sensor 12 may further determine a plurality of parameters based on a current exposure level and a scaling level of captured image information. The exposure level may be expressed as an exposure index value that indicates an amount of illumination intensity to which image sensor 12 is exposed when an image is captured. The scaling level may be expressed as a scaling factor, which indicates an amount of upscaling or downscaling of the image obtained by image sensor 12, e.g., a zoom factor.

Adaptive spatial image filter 14 filters the image information captured by image sensor 12. In particular, adaptive spatial image filter 14 filters at least one channel, i.e., one or more of the Y, Cb, or Cr channels, of the image information captured by image sensor 12. Adaptive spatial image filter 14 may "adapt," i.e., configure itself, based on the one or more parameters specified by image sensor 12. Exemplary parameters include smoothing degree (p), horizontal sharpening degree ($k_H$), vertical sharpening degree ($k_V$), sharpening subtraction threshold ($e_1$), maximum positive sharpening limit ($e_2$), and maximum negative sharpening limit ($e_3$). The horizontal sharpening filter and vertical sharpening filter are represented by the filter functions $F_H$ and $F_V$.

Once configured, adaptive spatial image filter 14 may first apply a smoothing filter to the Y, i.e., luminance, channel of the YCbCr-encoded image information to generate smoothed image information. In some embodiments, the smoothing filter may be a three-by-three (3×3) smoothing filter. Adaptive image filter 14 also may apply a horizontal sharpening filter to the Y channel of the smoothed image information to generate horizontally sharpened image information. In addition, adaptive image filter 14 may apply a vertical sharpening filter to the Y channel of the smoothed image information to generate vertically sharpened image information. In some embodiments, application of the horizontal and vertical sharpening filters may occur simultaneously, and in other embodiments, application of these filters may occur sequentially.

Adaptive image filter 14 may clamp the horizontally and vertically sharpened image information according to the maximum positive and negative sharpening limits ($e_2$, $e_3$), as well as subtract sharpening subtraction threshold ($e_1$) from both of the horizontally and vertically sharpened image information. After clamping and subtracting, adaptive spatial image filter 14 may sum the smoothed, horizontally sharpened, and vertically sharpened image information to generate the filtered image information. In this manner, adaptive image filter 14 may smooth out the noise and enhance the image at the same time, as described in more detail below. As a result of applying the adaptive spatial image filter to the captured image information, image information may be refined such that noise and other image anomalies are significantly reduced even though the adaptive spatial image filter applies both smoothing and sharpening filters that conventionally would serve to distort the image further.

Image processor 16 receives the filtered image information from adaptive image filter 14 and performs any necessary processing on the filtered image information. Image processor 16 may, for example, perform cropping, compression, image enhancement, or other processing of the image information captured by image sensor 12. Image processor 16, as well as adaptive spatial image filter 14, may be realized by one or more microprocessors, digital signal processors (DSPs), application specification integrated circuits (ASICs), field programmable gate arrays (FPGAs), or any other equivalent discrete or integrated logic circuitry. In some embodiments, adaptive spatial image filter 14 and image processor 16 may form part of an encoder-decoder (CODEC) that encodes the image information according to a particular encoding technique or format, such as MPEG-2, MPEG-4, ITU H.263, ITU H.264, JPEG, GIF, TIFF or the like.

Image processor 16 stores the filtered image information in image storage device 18. Image processor 16 may store raw image information, processed image information, or encoded information in image storage device 18. If the image information is accompanied by audio information, the audio also may be stored in image storage device 18, either independently or in conjunction with the video information. Image storage device 18 may comprise any volatile or non-volatile memory or storage device, such as read-only memory (ROM), electrically erasable programmable read-only memory (EEPROM), or FLASH memory, or such as a magnetic data storage device or optical data storage device.

Figure 2:
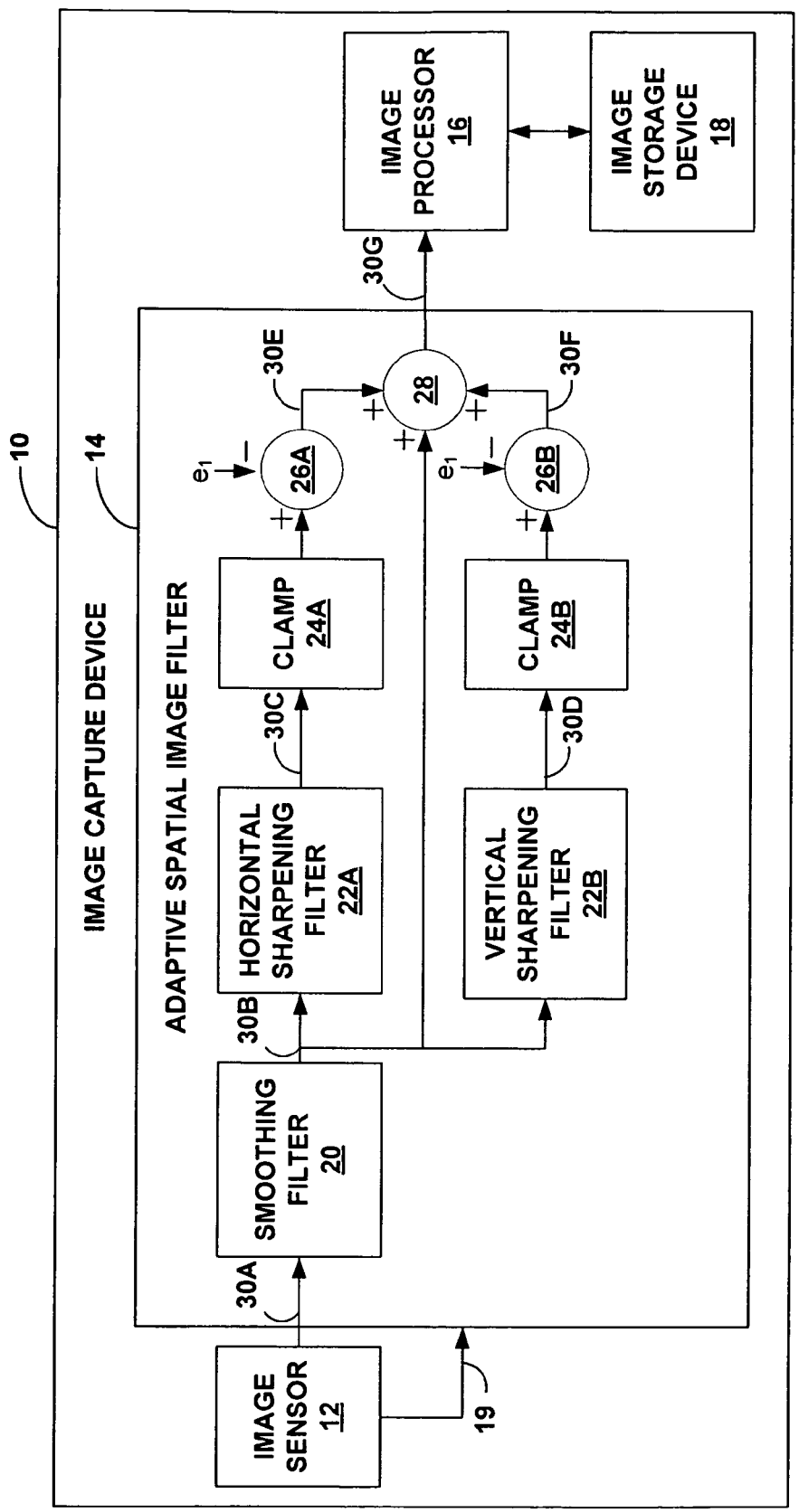
FIG. 2 is a block diagram illustrating the image capture device of FIG. 1 in further detail.

FIG. 2 is a block diagram illustrating image capture device 10 in further detail. As described above, image capture device 10 includes adaptive spatial image filter 14, which performs image processing operations on the Y channel of the YCbCr-encoded image information from image sensor 12. As illustrated in FIG. 2, adaptive spatial image filter 14 includes a smoothing filter 20, a horizontal sharpening filter 22A, a vertical sharpening filter 22B, clamps 24A, 24B ("clamps 24"), subtractors 26A, 26B ("subtractors 26"), and summation unit 28. Depiction of different features as units is intended to highlight different functional aspects of adaptive image filter 14, and does not necessarily imply that such units must be realized by separate hardware and/or software components. Rather, functionality associated with one or more units may be integrated within common hardware and/or software components.

As described above, image sensor 12 determines a plurality of parameter values 19 based on a current exposure level and a scaling level of captured image information 30A. Hence, in the example of FIG. 2, image sensor 12 includes suitable hardware and/or software components to determine parameter values 19. Alternatively, determination of the parameter values 19 may be performed in a different hardware or software unit outside of image sensor 12. Determination of parameter values 19 within image sensor 12 will be described for purposes of illustration.

Figure 4A:
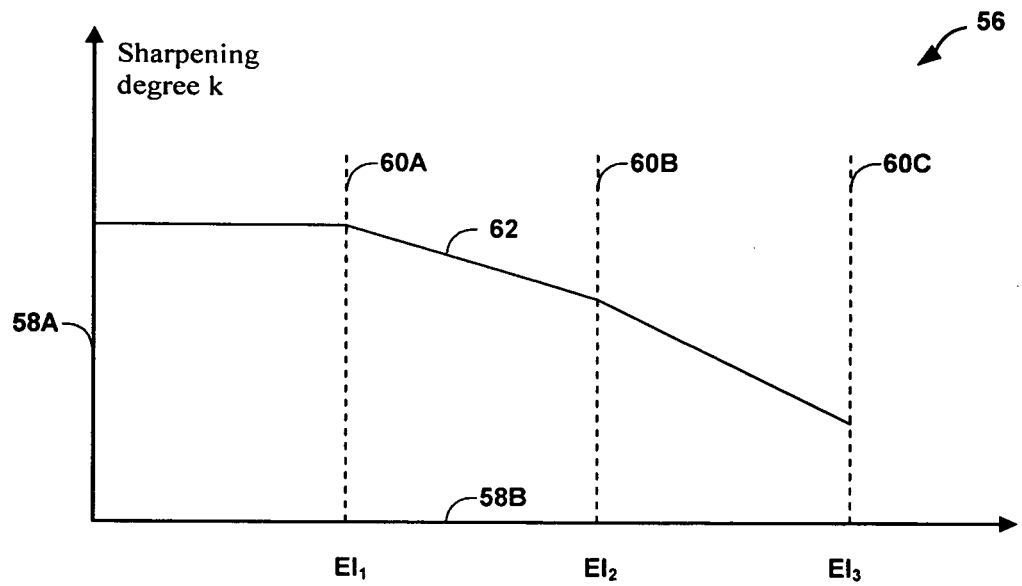
FIGS. 4A and 4B are graphs illustrating exemplary operation of the image sensor of FIG. 2 in determining a plurality of parameter values via linear interpolation.
Figure 4B:
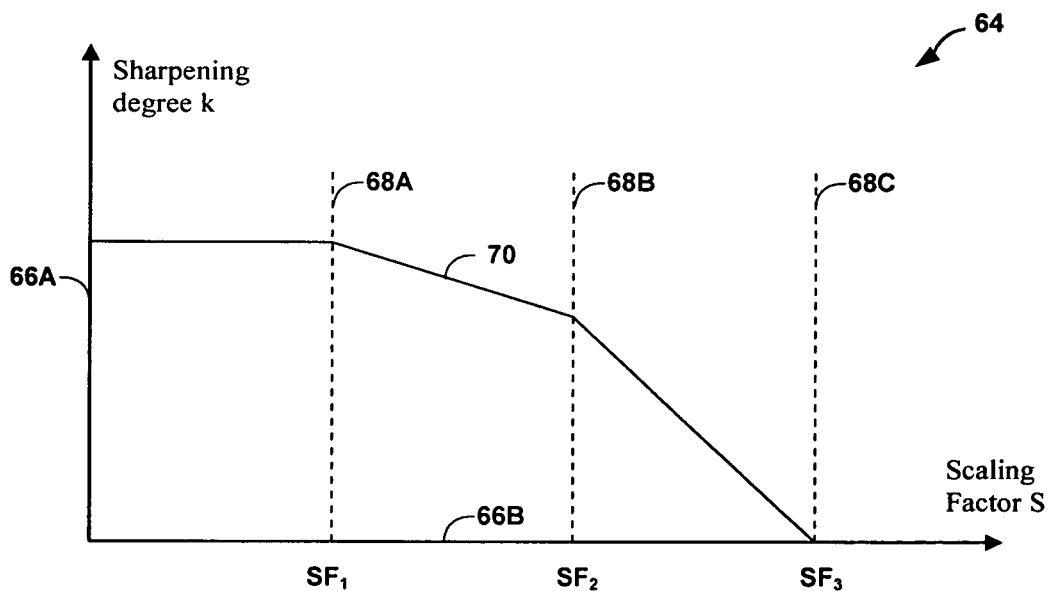

Image sensor 12 may perform linear interpolation according to curves such as those shown in the charts in FIGS. 4A and 4B. The interpolation values represented by the curves may be stored, for example, in a lookup table (LUT), derived from a function, or presented in other ways. In performing linear interpolation, image sensor 12 may interpolate parameter values 19 based on a current exposure level according to the chart of FIG. 4A. Image sensor 12 computes the current exposure level based on characteristics of the captured image information 30A. From this current exposure level, image sensor 12 classifies the current exposure level according to exposure levels that each define a plurality of static parameter values.

Static parameter values refer to a set of predetermined parameter values that serve as starting data points for interpolation of parameter values. Additional parameter values may be determined between the static parameter values using interpolation. Image sensor 12 also determines the difference between the exposure index and the classification. Using this difference, image sensor 12 interpolates parameter values 19 from the plurality of static parameter values of the classification based on the determination of the difference.

Image sensor 12 also may interpolate parameter values 19 based on a scaling factor of image information 30A according to the chart of FIG. 4B. Image sensor 12 classifies the scaling factor of image information 30A according to scaling factor levels that each define a plurality of static parameter values. Image sensor 12 determines the difference between the scaling factor and the classification. After determining the difference, image sensor 12 interpolates parameter values 19 from the plurality of static parameter values of the classification based on the determination of the difference. Linear interpolations, e.g., according to curves similar to those shown in the charts of FIGS. 4A and 4B, may be performed in any order, and the subsequent linear interpolation may modify parameter values 19 determined from the preceding linear interpolation. Parameter values 19 may include a smoothing degree, horizontal sharpening degree, vertical sharpening degree, maximum positive sharpening limit, and maximum negative sharpening limit.

Image sensor 12 outputs the interpolated parameter values 19 to adaptive spatial image filter 14 for use in adapting the characteristics of the filter to the image information. Upon receiving interpolated parameter values 19, adaptive spatial image filter 14 adapts, i.e., configures itself, by setting the associated parameters within smoothing filter 20, horizontal sharpening filter 22A, vertical sharpening filter 22B, clamps 24, and subtractors 26 to corresponding values defined by parameter values 19 received from image sensor 12. Again, parameter values 19 may be determined by image sensor 12 or some other component within image capture device 10. Adaptive spatial image filter 14 sets the smoothing degree (p) parameter with the associated smoothing degree (p) parameter value included in parameter values 19. The smoothing degree (p) may be expressed as a percentage of the smoothing degree. When p=0%, the filter is an I filter with no smoothing effect. When p=100%, the filter is an average filter with the maximum smoothing effect achievable by the given filter, e.g., a 3×3 filter.

Adaptive spatial image filter 14 also sets the horizontal sharpening degree ($k_H$) parameter and the vertical sharpening degree ($k_V$) parameter of respective horizontal sharpening filter 22A and vertical sharpening filter 22B according to parameter values 19 received from image sensor 12. Further, adaptive spatial image filter 14 sets the sharpening subtraction threshold ($e_1$) parameter of subtractors 26 and the maximum positive sharpening limit ($e_2$), and the maximum negative sharpening limit ($e_3$) parameters of clamps 24 with the associated sharpening subtraction threshold ($e_1$), maximum positive sharpening limit ($e_2$), and maximum negative sharpening limit ($e_3$) parameter values of parameter values 19. In some embodiments, a designer may configure the below described matrices of horizontal sharpening filter ($F_H$) 22A and vertical sharpening filter ($F_V$) 22B to implement adaptive spatial filter 14.

Typically, prior to outputting captured image information 30A to smoothing filter 20, image sensor 12 translates captured image information 30A into the YCbCr color space. Thus, image information 30A may comprise image information arranged into the three channels, i.e., the Y channel, the Cb channel, and the Cr channel, of the YCbCr color space. Upon receiving image information 30A and after adapting to the current exposure index and scaling factor, smoothing filter 20 filters at least one channel of image information 30A. In particular, smoothing filter 20 may filter the Y channel of image information 30A to reduce noise sensitivity of the Y channel. As an example, smoothing filter 20 may comprise a filter described by the following equation (1):

$$F_{smoothing} = \frac{1}{9}\begin{bmatrix} 1 & 1 & 1 \\ 1 & 1 & 1 \\ 1 & 1 & 1 \end{bmatrix} + (1 - p/100) \cdot \frac{1}{9}\begin{bmatrix} -1 & -1 & -1 \\ -1 & 8 & -1 \\ -1 & -1 & -1 \end{bmatrix} \quad (1)$$

$F_{smoothing}$ is the notation for smoothing filter 20. The p variable in equation (1) indicates the smoothing degree (p) parameter, which adaptive spatial image filter 14 sets during configuration. Once set, adaptive spatial image filter 14 may resolve equation (1) into a single spatial filter. If p is set to 100, as noted above, the resulting spatial smoothing filter 20 comprises a three-by-three average filter, i.e., a filter specifying three rows of 1's by three columns of 1's multiplied by 1/9th. If p is set to 0, the resulting smoothing filter 20 comprises an I filter, i.e., a three-by-three filter with a single 1 at the center position, with no smoothing effect. Notably, regardless of the value of p, the resulting coefficients of smoothing filter 20 sum to 1, and this property ensures retention of the brightness of image information 30A.

Adaptive spatial image filter 14 may apply smoothing filter 20 and all other filters described below in a conventional pixel-by-pixel process. The process generally begins by applying a filter, such as smoothing filter 20 to the upper left corner of image information 30A such that the upper left coefficient of smoothing filter 20 lies on top of the uppermost, leftmost portion of image information 30A. Adaptive spatial image filter 14 multiplies the value of each coefficient of smoothing filter 20 by the underlying image information 30A and sums the result of the each multiplication to generate a portion of smoothed information 30B. Adaptive spatial image filter 14 next moves smoothing filter 20 over one pixel worth of image information 30A to the right and repeats the above multiplication and summation operations. Upon reaching the rightmost pixel of image information 30A, adaptive spatial image filter 20 moves smoothing filter 20 down one pixel of image information 30A and repeats the multiplication and summation process again until all rows and columns of image information 30A have been translated into smoothed image information 30B.

After generating smoothed image information 30B, adaptive spatial image filter 14 applies either successively or simultaneously horizontal and vertical sharpening filters 22A, 22B to smoothed image information 30B to generate horizontally sharpened image information 30C and vertically sharpened image information 30D, respectively. In some embodiments, the horizontal and vertical sharpening filters may be realized by first and second five-by-five (5×5) edge sharpening filters. An exemplary horizontal sharpening filter 22A, for example, may be described by the following matrix equation (2):

$$F_{sharpen\_H} = \frac{1}{6} \cdot \begin{bmatrix} -1 & -1 & -1 & -1 & -1 \\ -2 & -2 & -2 & -2 & -2 \\ 6 & 6 & 6 & 6 & 6 \\ -2 & -2 & -2 & -2 & -2 \\ -1 & -1 & -1 & -1 & -1 \end{bmatrix} \quad (2)$$

In matrix equation (2), $F_{sharpen\_H}$ is the notation for horizontal sharpening filter 22A. As shown in equation (2) by the identical row coefficients, e.g., [−1, −1, −1, −1, −1], horizontal sharpening filter 22A comprises a low pass component. As further shown in equation (2) by the varying column coefficients, i.e., [−1, −2, 6, −2, −1], horizontal sharpening filter 22A also comprises a high pass component.

An exemplary vertical sharpening filter 22B may be described by the following matrix equation (3):

$$F_{sharpen\_V} = \frac{1}{6} \cdot \begin{bmatrix} -1 & -2 & 6 & -2 & -1 \\ -1 & -2 & 6 & -2 & -1 \\ -1 & -2 & 6 & -2 & -1 \\ -1 & -2 & 6 & -2 & -1 \\ -1 & -2 & 6 & -2 & -1 \end{bmatrix} \quad (3)$$

In matrix equation (3), $F_{sharpen\_V}$ is the notation for vertical sharpening filter 22B. As shown in equation (3) by the identical column coefficients, e.g., [−1, −1, −1, −1, −1], vertical sharpening filter 22B comprises a low pass component. As further shown in equation (3) by the varying row coefficients, i.e., [−1, −2, 6, −2, −1], vertical sharpening filter 22B comprises a high pass component. Notably, the coefficients of both horizontal and vertical sharpening filters 22A, 22B sum to 0 but only in one direction, which darkens the image along identified edges. Thus, filters 22A, 22B enhance edges, i.e., sharpens the image, by darkening the image along edges in the respective horizontal and vertical directions. Filters 22A, 22B may be independently programmable according to system requirements. For example, in order to better fit a fixed-point hardware implementation, in some embodiments, the parameter set may be changed to [−1, −3, 8, −3, −1]. The two filters (2) and (3) may each have the spatial properties such that they are a high pass filter (HPF) in one dimension and a low pass filter (LPF) in the other dimension.

After applying horizontal and vertical sharpening filters 22A, 22B and outputting horizontally and vertically sharpened image information 30C, 30D, adaptive spatial image filter 14 applies clamp 24A and subtractor 26A to horizontally sharpened image information 30C and clamp 24B and subtractor 26B to vertically sharpened image information 30D. Application of clamp 24A and subtractor 26A to horizontally sharpened image information 30C may be described by the following equation (4):

$$S'_H = \begin{cases} e3 + e1 & S_H < e3 \\ S_H + e1 & e3 \leq S_H \leq -e1 \\ 0 & \text{if } -e1 \leq S_H \leq e1 \\ S_H - e1 & e1 \leq S_H \leq e2 \\ e2 - e1 & S_H \geq e2 \end{cases} \quad (4)$$

The variable $S'_H$ refers to the output of subtractor 26A after clamping, which is shown in FIG. 2 by image altered horizontally sharpened image information 30E. The variable $S_H$ refers to horizontally sharpened image information 30C. The variable $e_1$ refers to the sharpening subtraction threshold ($e_1$) parameter within subtractor 26A set by adaptive spatial image filter 14 during configuration. The variables $e_2$ and $e_3$ refer to the maximum positive sharpening limit ($e_2$) and the maximum negative sharpening limit ($e_3$) parameters within clamp 24A set by adaptive spatial image filter 14 during configuration. An equation that is substantially similar to equation (4) exists to define $S_V'$, or altered vertically sharpened image information 30F, for ease of illustration, it is not explicitly defined herein. Substitution of $S_V'$ for $S_H'$ and $S_V$, i.e., vertically sharpened image information 30D, for $S_H$ will result in the equation for $S_V'$, e.g., as follows in equation (5):

$$S_V' = \begin{cases} e3+e1 & S_V < e3 \\ S_V+e1 & e3 \leq S_V \leq -e1 \\ 0 & \text{if } -e1 \leq S_V \leq e1 \\ S_V-e1 & e1 \leq S_V \leq e2 \\ e2-e1 & S_V \geq e2 \end{cases} \quad (5)$$

Once the image information is clamped and subtracted according to equations (4) and (5), adaptive spatial image filter 14 sums smoothed image information 30B, altered horizontally sharpened image information 30E, and altered vertically sharpened image information 30F via summation unit 28. Summation unit 28 may implement the following weighted summation equation (6):

$$I' = I + k_H \cdot S_H' + k_V \cdot S_V' \quad (6)$$

I' refers to the result of applying adaptive spatial image filter 14 to produce filter image information, which is shown in FIG. 2 by filtered image information 30G. I refers to smoothed image information 30B. $S_H'$ and $S_V'$ refer to altered horizontal and vertical image information 30E, 30F, as described above. The variable $k_H$ refers to the horizontal sharpening degree parameter that may reside within horizontal sharpening filter 22A and that adaptive spatial image filter 14 set during configuration. The variable $k_V$ refers to the vertical sharpening degree ($k_V$) parameter that may reside within vertical sharpening filter 22B and that adaptive spatial image filter 14 also set during configuration. The sum of the smoothed image information I, the horizontally sharpened image information $k_H * S_H'$, and the vertically sharpened image information $k_H * S_V'$ produces the resulting filtered image information I'.

Once summation unit 28 produces filtered image information 30G, it outputs the result to image processor 16, which may perform the processing described above. Typically, in embodiments where image capture device 10 comprises a camera phone or video phone, image processor 16 may convert filtered image information 30G into the JPEG format. Once converted, image processor 16 may store filtered image information 30G in image storage device 18, also as described above. In summary, via the above process, adaptive spatial image filter 14 adaptively smoothes and sharpens image information 30A according to a current image exposure level and a scaling factor level of image information 30A to produce filtered image information 30G.

Figure 3:
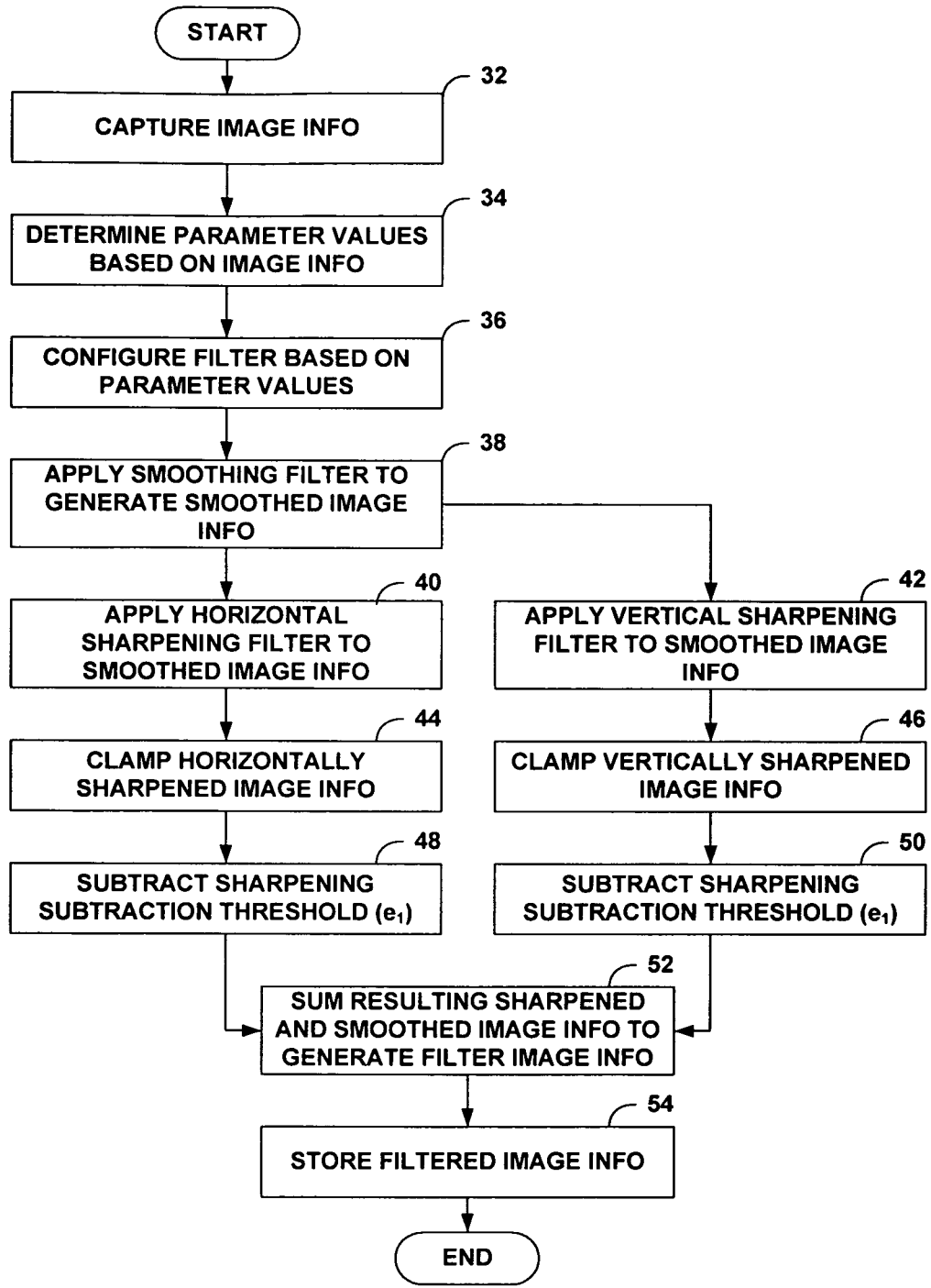
FIG. 3 is a flow diagram illustrating exemplary operation of an adaptive spatial image filter in filtering image information based on a current exposure level and a scaling level of the image information.

FIG. 3 is a flow diagram illustrating exemplary operation of adaptive spatial image filter 14 of FIG. 2 in filtering image information 30A based on a current exposure level and a scaling level of image information 30A. In some instances, a designer may configure horizontal and vertical sharpening filters 22A, 22B in the manner described below to reduce halo effects associated with the degree of sharpening width. Typically, the designer performs this configuration during the design phase of image capture device 10. However, filters 22A, 22B may be configured at any time and, in some embodiments, may be configured during active operation of image capture device 10.

Initially, in the example of FIG. 3, image sensor 12 captures image information 30A and translates image information 30A into the YCbCr color space (32). A plurality of parameter values 19 relating to the image information 30A are determined (34), e.g., by image sensor 12. Image sensor 12 may apply linear interpolation according to the graphs of FIGS. 4A, 4B (34) to produce the parameter values. In this example, image sensor 12 outputs image information 30A and parameter values 19 to adaptive spatial image filter 14. Adaptive image filter 14 configures itself, i.e., adapts, based on parameter values 19, as described above (36). For example, adaptive spatial image filter 14 may set a smoothing degree (p) parameter for smoothing filter 20, a horizontal sharpening degree ($k_H$) parameter for horizontal sharpening filter 22A, a vertical sharpening degree ($k_V$) parameter for vertical sharpening filter 22B, a sharpening subtraction threshold ($e_1$) for subtractor 26, and maximum positive and negative sharpening limit ($e_2$, $e_3$) parameters for clamps 24. The various parameter values for adaptive spatial image filter 14 correspond to associated parameter values 19 provided by image sensor 12.

Once configured, adaptive spatial image filter 14 may first apply smoothing filter 20 to at least one channel of image information 30A (38). Smoothing filter 20 may, for example, operate according to the above equation (1) to generate smoothed image information 30B from the Y channel of image information 30A. Both horizontal and vertical sharpening filters 22A, 22B may next filter the Y channel of smoothed image information 30B to generate respective horizontally and vertically sharpened image information 30C, 30D (40, 42). For example, horizontal and vertical sharpening filters 22A, 22B may operate according to the above equations (2) and (3), respectively.

Upon generating horizontally and vertically sharpened image information 30C, 30D, adaptive spatial image filter 14 may further clamp both horizontally and vertically sharpened image information 30C, 30D via clamps 24 (44, 46). Adaptive spatial image filter 14 employs clamps 24 to avoid over sharpening, which can cause unwanted visual artifacts. After clamping, adaptive spatial image filter 14 applies subtractors 26 to the result of clamping horizontally and vertically sharpened image information 30C, 30D, thereby ensuring that noises are not being sharpened (48, 50). For example, the combination of clamps 24 and subtractors 26 may operate according to equations (4) and (5), which specify a series of operation dependent upon an initial comparison to either or both of the maximum positive sharpening limit ($e_2$) and the maximum negative sharpening limit ($e_3$). The output of subtractors 26 comprises altered horizontally and vertically sharpened image information 30E, 30F.

Summation unit 28 receives altered horizontally and vertically sharpened image information 30E, 30F and sums these with smoothed image information 30B (52) to generate filtered image information 30G (52). Image processor 16 may perform image processing to filtered image information 30G and then store filtered image information 30G to image storage device 18 (54). While described above to suggest simultaneous horizontal and vertical filtering by horizontal and vertical sharpening filters 22A, 22B, adaptive spatial image filter 14 may apply each of horizontal and vertical sharpening filters 22A, 22B in succession, such that one is applied before another.

FIGS. 4A, 4B are graphs illustrating exemplary operation of image sensor 12 of FIG. 2 in determining a plurality of parameter values 19 via linear interpolation. FIG. 4A shows a graph 56 that visually defines linear interpolation of the plurality of parameter values 19 based on a current exposure index (EI) of image information 30A. FIG. 4B shows a graph 64 that visually defines linear interpolation of the plurality of parameter values 19 based on a scaling factor (SF) of image information 30A.

Exposure indices may denote bright light, normal light and low light illuminant conditions. In general, if a current exposure level is equal to or less than a first exposure boundary between the bright light region and the normal light region, then the parameters associated with the bright light region will be applied. If the current exposure level is at approximately a second exposure boundary, then the parameters for the normal light region are applied. If the current exposure level is greater than the second exposure boundary, then the parameters for the low light region are applied.

For conditions between the first and second exposure boundaries, instead of having a hard boundary, interpolation can be used to do the transformation smoothly. For example, if the current exposure value is between the first and second exposure boundaries, the parameters can will be linearly interpolated between the set of parameter values for the bright light region and the set of parameter values for the normal light region, e.g., in proportion to the exposure value relative to the exposure values associated with the boundaries.

Similarly, if the current exposure value is greater than the second exposure boundary, then the parameters can be linearly interpolated between the set of parameter values for the normal light region and the set of parameter values for the low light region. When the current exposure index reaches a maximum exposure level, then the set of values for the low light region can be applied.

Referring to FIG. 4A, graph 56 includes y-axis 58A and x-axis 58B, where y-axis 58A defines increasing sharpening degree k and x-axis 58B defines increasing exposure index values. Y-axis 58A may define either or both of the horizontal sharpening degree ($k_H$) and vertical sharpening degree ($k_V$). Graph 56 also includes static exposure index levels 60A-60C ("exposure index levels 60"), where each of static exposure index levels 60 relate to a plurality of static parameter values.

Graph 56 further includes line 62 that defines a visual representation of a linear interpolation function based on static exposure index levels 60.

Line 62 may be represented by the following equation (7) used for calculating horizontal sharpening degree $k_H$:

$$k_H = \begin{cases} K_{static\_H\_1} & EI_{current} < EI_1 \\ ((K_{static\_H\_1} - K_{static\_H\_2})/(EI_2 - EI_1)) * EI_{current} & EI_1 \le EI_{current} < EI_2 \\ ((K_{static\_H\_2} - K_{static\_H\_3})/(EI_3 - EI_2)) * EI_{current} & \text{if } EI_2 \le EI_{current} < EI_3 \\ 0 & EI_3 \le EI_{current} \end{cases} \quad (7)$$

The variable $k_H$ represents the horizontal sharpening degree parameter, which is used in equation (6) above. $K_{static\_H\_1}$, $K_{static\_H\_2}$, and $K_{static\_H\_3}$ represent pre-defined static values associated with each of static current exposure index levels 60, i.e., $EI_1$, $EI_2$, and $EI_3$. $EI_{current}$ represents the current exposure index of image information 30A, as measured by image sensor 12. Looking to equation (7), if $EI_{current}$ is less than $EI_1$, then horizontal sharpening degree, $k_H$ equals $K_{static\_H\_H\_1}$, which defines the maximum horizontal sharpening degree available. If $EI_{current}$ is less than $EI_2$, but greater or equal to $EI_1$, $k_H$ equals the slope defined by (($K_{static\_H\_1}$ - $K_{static\_H\_2}$)/($EI_2$-$EI_1$)) multiplied by $EI_{current}$. If, however, $EI_{current}$ is less than $EI_3$, but greater or equal to $EI_2$, $k_H$ equals the slope defined by (($K_{static\_H\_2}$-$K_{static\_H\_3}$)/($EI_3$-$EI_2$)) multiplied by $EI_{current}$. Finally, if $EI_{current}$ is greater than or equal to $EI_3$, $k_H$ equals zero, or the lowest possible sharpening degree. A substantially similar equation (8) may be defined for determining vertical sharpening degree $k_V$, e.g., as follows:

$$k_V = \begin{cases} K_{static\_V\_1} & EI_{current} < EI_1 \\ ((K_{static\_V\_1} - K_{static\_V\_2})/(EI_2 - EI_1)) * EI_{current} & EI_1 \le EI_{current} < EI_2 \\ ((K_{static\_V\_2} - K_{static\_V\_3})/(EI_3 - EI_2)) * EI_{current} & \text{if } EI_2 \le EI_{current} < EI_3 \\ 0 & EI_3 \le EI_{current} \end{cases} \quad (8)$$

After capturing image information 30A, image sensor 12 may determine a value for horizontal sharpening degree parameter $k_H$ and vertical sharpening degree parameter $k_V$ according to respective equations (7) and (8). Through this linear interpolation, image sensor 12 may classify the current exposure index by comparing the current exposure index to static exposure index levels. Image sensor 12 may next determine the difference between the current exposure index and the classification and interpolate the current exposure index to determine sharpening degrees. Thus, adaptive spatial image filter 14 may adapt to the current exposure index of image information 30A.

Adaptive spatial filter parameters can also be adjusted according to an applicable image scaling factor. When the image is scaled down, the sharpening degree should be decreased because the downscaling processing itself tends to increases image sharpness and reduce noise. Again, linear interpolation can be used instead of a hard boundary to produce parameter values for different scaling factors as shown in FIG. 4B. If the downscaling factor is 1 or less than 1, the sharpening degree can be maintained as the sharpening degree of the original image. When the downscaling factor increases, the sharpening degree is decreased accordingly. When the downscaling factor increases to a limit, e.g., 4 or 8 depending on the original image size, there is no sharpening applied in the images. Through soft interpolation, the sharpening effect can be adjusted gradually and smoothly.

Referring to FIG. 4B, graph 64 includes y-axis 66A and x-axis 66B, where y-axis 66A defines increasing sharpening degree k and x-axis 66B defines increasing scaling factor values. Y-axis 66A may define either or both of the horizontal sharpening degree ($k_H$) and vertical sharpening degree ($k_V$). Graph 64 also includes static scaling factors 68A-68C ("static scaling factors 68"), where each of static scaling factors 68 relate to a plurality of static parameter values. Graph 64 further includes line 70, which defines a visual representation of a linear interpolation function based on static scaling factors 68.

Line 70 may be represented by the following equation (9) used for calculating horizontal sharpening degree $k_H$:

$$k_H = \begin{cases} K_{static\_H\_1} & SF_{current} < SF_1 \\ ((K_{static\_H\_1} - K_{static\_H\_2})/(SF_2 - SF_1)) * SF_{current} & SF_1 \leq SF_{current} < SF_2 \\ ((K_{static\_H\_2} - K_{static\_H\_3})/(SF_3 - SF_2)) * SF_{current} & \text{if } SF_2 \leq SF_{current} < SF_3 \\ 0 & SF_3 \leq SF_{current} \end{cases} \quad (9)$$

The variable $k_H$ represents the horizontal sharpening degree parameter, which is used in equation (6) above. $K_{static\_H\_1}$, $K_{static\_H\_2}$, and $K_{static\_H\_3}$ represent pre-defined static values associated with each of static scaling factors 68, i.e., $SF_1$, $SF_2$, and $SF_3$. $SF_{current}$ represents the current scaling factor of image information 30A, as determined by image sensor 12. Looking to equation (9), if $SF_{current}$ is less than $SF_1$ than horizontal sharpening degree $k_H$ equals $K_{static\_H\_1}$, which defines the maximum horizontal sharpening degree available. If $SF_{current}$ is less than $SF_2$, but greater or equal to $SF_1$, $k_H$ equals the slope defined by (($K_{static\_H\_1}$-$K_{static\_H\_2}$)/($SF_2$-$SF_1$)) multiplied by $SF_{current}$. If, however, $SF_{current}$ is less than $SF_3$, but greater or equal to $SF_2$, $k_H$ equals the slope defined by (($K_{static\_H\_2}$-$K_{static\_H\_3}$)/($SF_3$-$SF_2$)) by multiplied by $SF_{current}$. Finally, if $SF_{current}$ is greater than or equal to $SF_3$, $k_H$ equals zero, or the lowest possible sharpening degree. A substantially similar equation (10) may be defined for determining vertical sharpening degree $k_V$, e.g., as follows:

$$k_V = \begin{cases} K_{static\_V\_1} & SF_{current} < SF_1 \\ ((K_{static\_V\_1} - K_{static\_V\_2})/(SF_2 - SF_1)) * SF_{current} & SF_1 \leq SF_{current} < SF_2 \\ ((K_{static\_V\_2} - K_{static\_V\_3})/(SF_3 - SF_2)) * SF_{current} & \text{if } SF_2 \leq SF_{current} < SF_3 \\ 0 & SF_3 \leq SF_{current} \end{cases} \quad (10)$$

After capturing image information 30A, image sensor 12 may determine a value for horizontal sharpening degree parameter $k_H$ and vertical sharpening degree parameter $k_V$ according to respective equations (9) and (10). Through this linear interpolation, image sensor 12 may classify the current scaling factors by comparing the current scaling factor to static scaling factor 68. Image sensor 12 may next determine the difference between the current scaling factor and the classification and interpolate the current scaling factor to determine sharpening degrees. Thus, adaptive spatial image filter 14 may adapt to the current scaling factor of image information 30A.

Figure 5A:
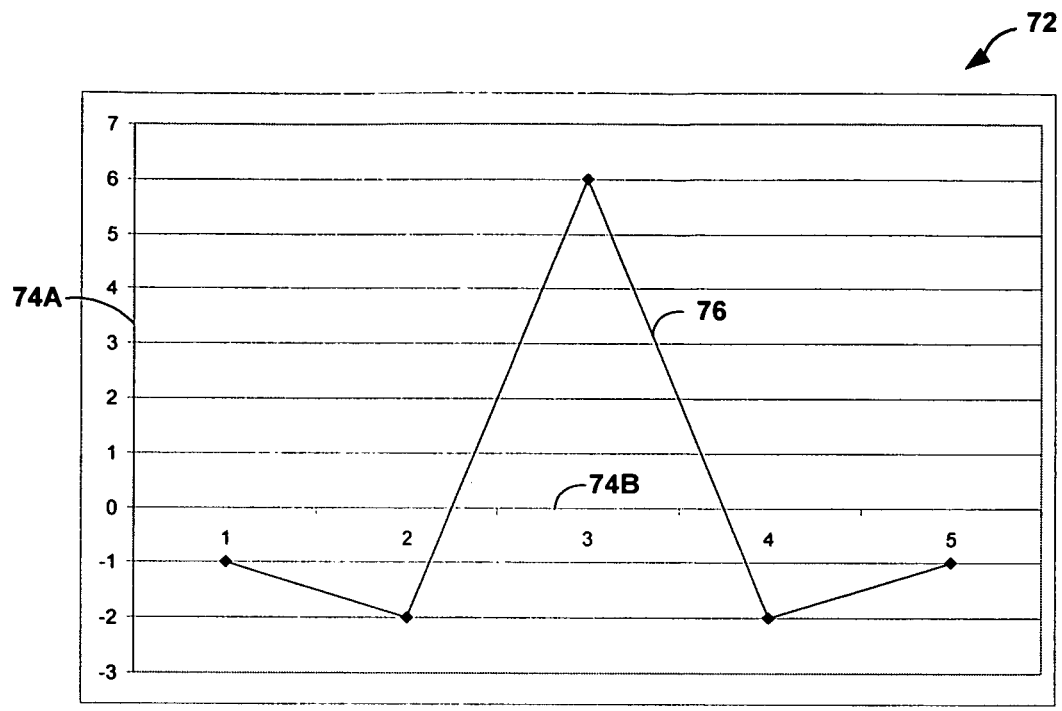
FIG. 5A is a graph illustrating coefficients for a high pass filter in one dimension for sharpening.
Figure 5B:
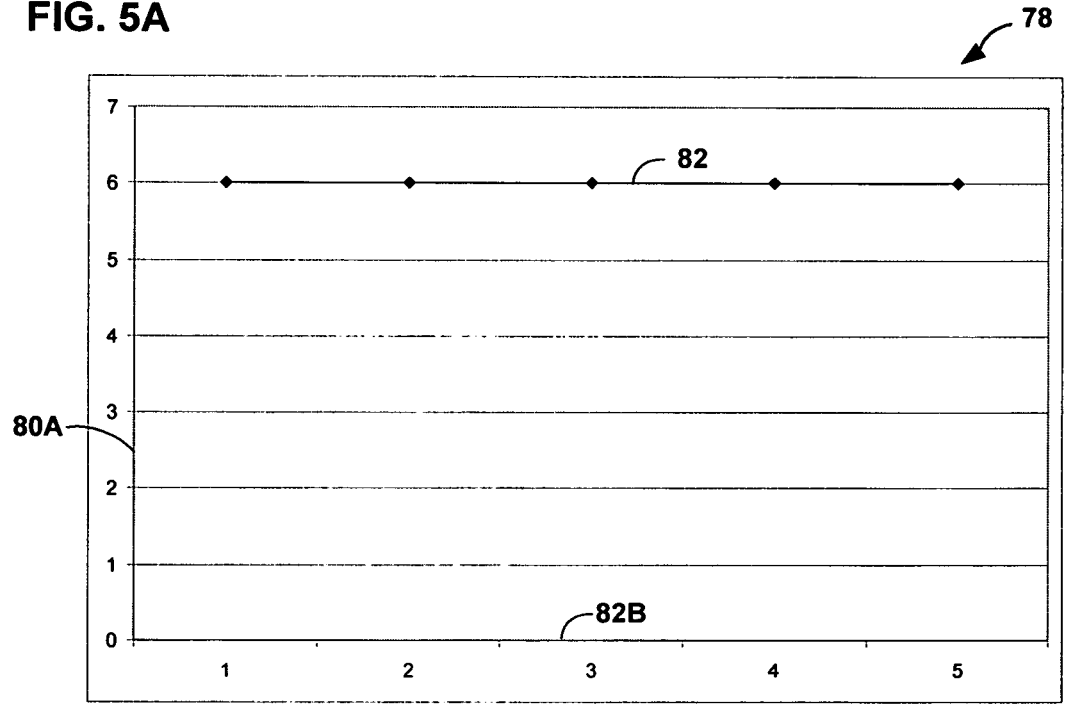
FIG. 5B is a graph illustrating coefficients for a low pass filter in another dimension for smoothing.

FIG. 5A is a graph illustrating coefficients [−1, −2, 6, −2, −1] for a high pass filter in one dimension for sharpening. FIG. 5B is a graph illustrating coefficients [6, 6, 6, 6, 6] for a low pass filter in another dimension for smoothing. The coefficients represented by FIGS. 5A and 5B may be applied to either of horizontal or vertical sharpening filters 22A, 22B of FIG. 2. FIG. 5A shows a graph 72 that visually defines a coefficient set, and specifically a high pass component, for a horizontal sharpening filter 22A over a range of pixels. Graph 72 of FIG. 5A corresponds to matrix (3) above. FIG. 5B shows a graph 78 that visually defines a coefficient set, and specifically a low pass component, for a horizontal smoothing filter 22A over a range of pixels. Graph 78 of FIG. 5B generally corresponds to matrix (2) above. Both of graphs 72, 78 may also be illustrative of the respective high and low pass components of vertical sharpening filter 22B; however, for ease of illustration, graphs 72, 78 are described herein in reference to horizontal sharpening filter 22A.

Referring to FIG. 5A, graph 72 includes y-axis 74A and a x-axis 74B, which respectively define magnitude and pixel number. Within graph 72 lies a line 76 that defines the high pass component of horizontal sharpening filter 22A. High pass component line 76 corresponds to the matrix of the above defined exemplary equation (2) in that the coefficients of the matrix along each column specify the magnitude over the range of pixels. Thus, the first column of that matrix defines a [−1, −2, 6, −2, −1] column which corresponds to the points of high pass component line 76. The high pass component, illustrated by line 76, enables horizontal sharpening filter 22A to sharpen horizontal lines.

Referring to FIG. 5B, graph 78 includes y-axis 80A and a x-axis 80B, which respectively define magnitude of response and pixel number. Within graph 78 lies a line 82 that defines the low pass component of horizontal sharpening filter 22A. Low pass component line 74 corresponds to the matrix of the above defined exemplary equation (2) in that the coefficients of the matrix along each row specify the magnitude over the range of pixels. Thus, the third row of that matrix defines a [6, 6, 6, 6, 6] row which corresponds to the points of low pass component line 82. The low pass component, illustrated by line 82, enables horizontal sharpening filter 22A to reduce noise and make the sharpened edges look cleaner.

Both of graphs 72, 78 reflect respective high and low pass components of horizontal sharpening filter 22A, which may be configurable by a designer prior to operating image capture device 10 or by a user during operation of image capture device 10. Although described above as being static, the designer and/or user may specify different matrix coefficients for the matrix of either or both of equations (2) and (3) to correct for halo effects described below in reference to FIGS. 6A, 6B. For example, it is possible to reduce the halo effect by choosing a smaller sharpening factor or a high pass filter (HPF) with a different frequency response.

Figure 6A:
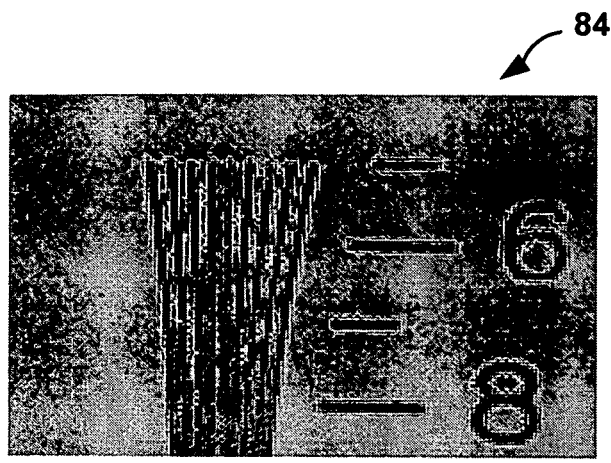
FIGS. 6A and 6B are images illustrating exemplary image information and filtered image information, respectively.
Figure 6B:
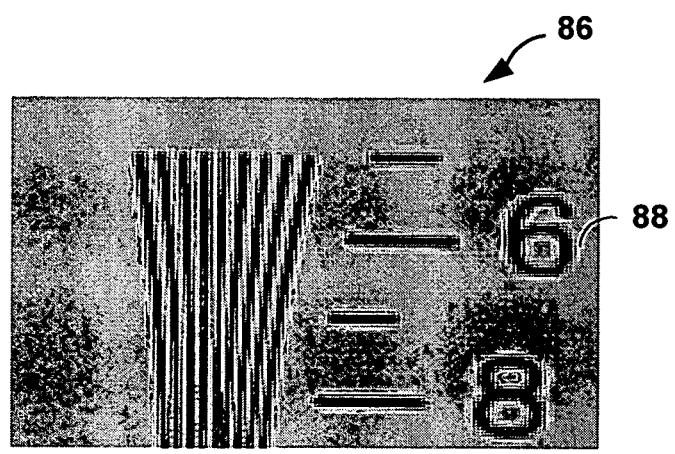

FIGS. 6A and 6B are images illustrating exemplary image information 84 and filtered image information 86, respectively. Image information 84 shown in FIG. 6A may be substantially similar to image information 30A of FIG. 2 in that image sensor 12 may output image information 84 to adaptive spatial image filter 16. Filtered image information 86 may be substantially similar to filtered image information 30G in that filtered image information 86 may result from application of adaptive spatial image filter 14 to image information 86. Filtered image information 86 includes halo effect 88, which results from application of adaptive spatial image filter 14. In particular, halo effect 88 occurs because of application of respective horizontal and vertical sharpening filters 22A, 22B. Because filters 22A, 22B may be configured via a respective horizontal sharpening filter ($F_H$) parameter and a vertical sharpening filter ($F_V$) parameter, halo effect 88 may be reduced as described below in reference to FIG. 7.

Figure 7:
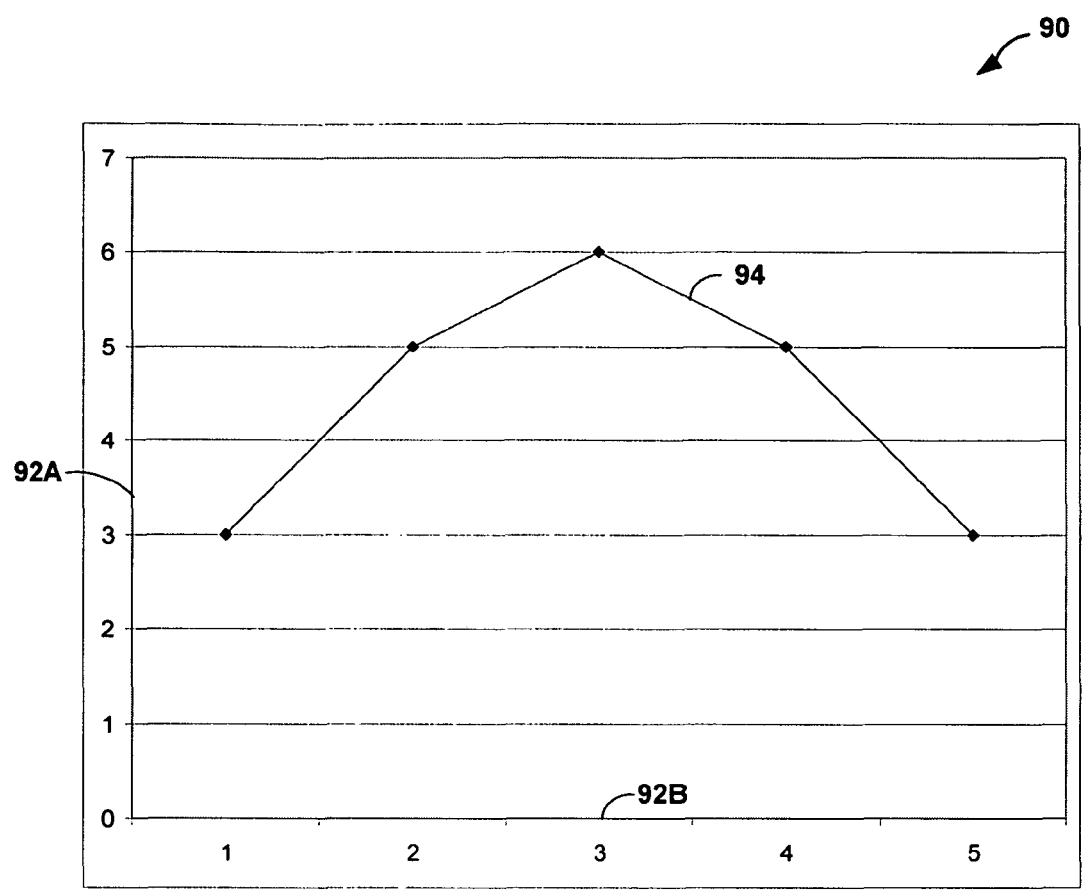
FIG. 7 is a graph illustrating a parameter set for either of the vertical or horizontal sharpening filters of FIG. 2.

FIG. 7 is a graph illustrating parameters for either of vertical or horizontal sharpening filters 22A, 22B of FIG. 2. FIG. 7 shows a graph 90 that visually defines filter coefficients, and specifically the low pass component, for horizontal sharpening filter 22A, for example, over a range of pixels. Graph 90 includes an x-axis 92A and a y-axis 92B, which respectively define magnitude and pixel number. Within graph 90 lies a line 94 that defines the low pass component of horizontal sharpening filter 22A after adjusting the horizontal sharpening filter ($F_H$) parameter. In this instance, horizontal sharpening filter 22A may be described by the following equation (11):

$$F_{\text{sharpen\_H}} = \frac{1}{6} \cdot \begin{bmatrix} -4 & -2 & -1 & -2 & -4 \\ -5 & -3 & -2 & -3 & -5 \\ 3 & 5 & 6 & 3 & 5 \\ -5 & -3 & -2 & -3 & -5 \\ -4 & -2 & -1 & -2 & -4 \end{bmatrix} \quad (11)$$

Low pass component line 94 corresponds to the matrix of the above defined exemplary equation (11) in that the coefficients of the matrix along each row specify the magnitude of the response over pixels. Thus, the third row of that matrix defines a [3, 5, 6, 3, 5] row which corresponds to the points of low pass component line 94. By configuring the low pass component, illustrated by line 94, horizontal sharpening filter 22A may reduce the smoothing degree, thereby possibly reducing halo effect 88 of FIG. 6B. Reduction of halo effect 88 results in less white space around dark edges. Halo effect 88 may also be reduced through smaller magnitude of response, i.e., smaller coefficients, along the high pass component of horizontal sharpening filter 22A.

Figure 8A:
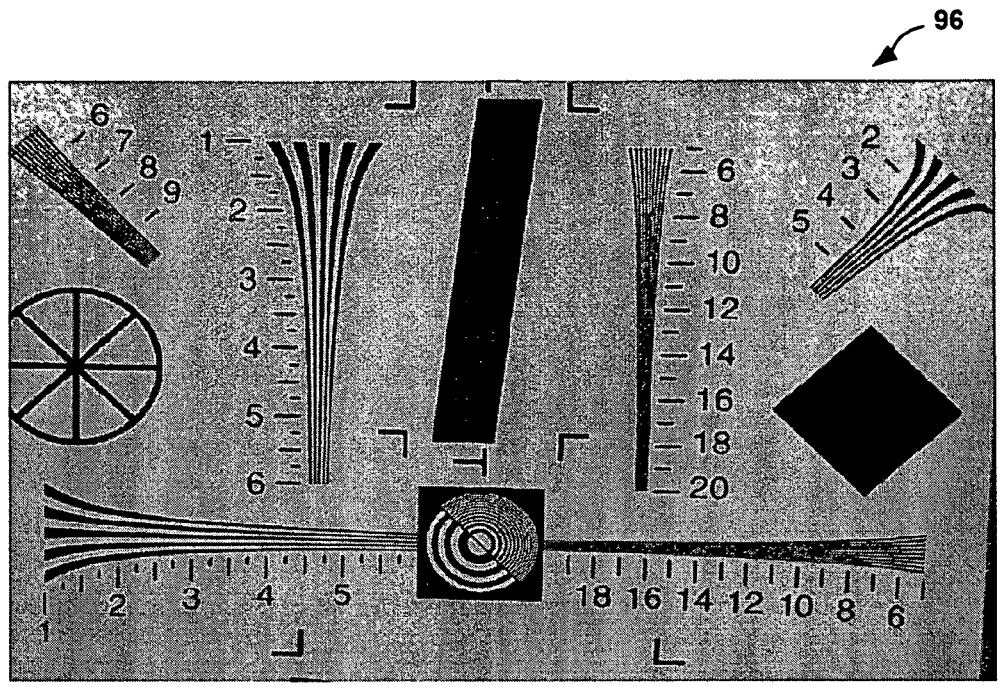
FIGS. 8A and 8B are images illustrating exemplary image information and filtered image information, respectively.
Figure 8B:
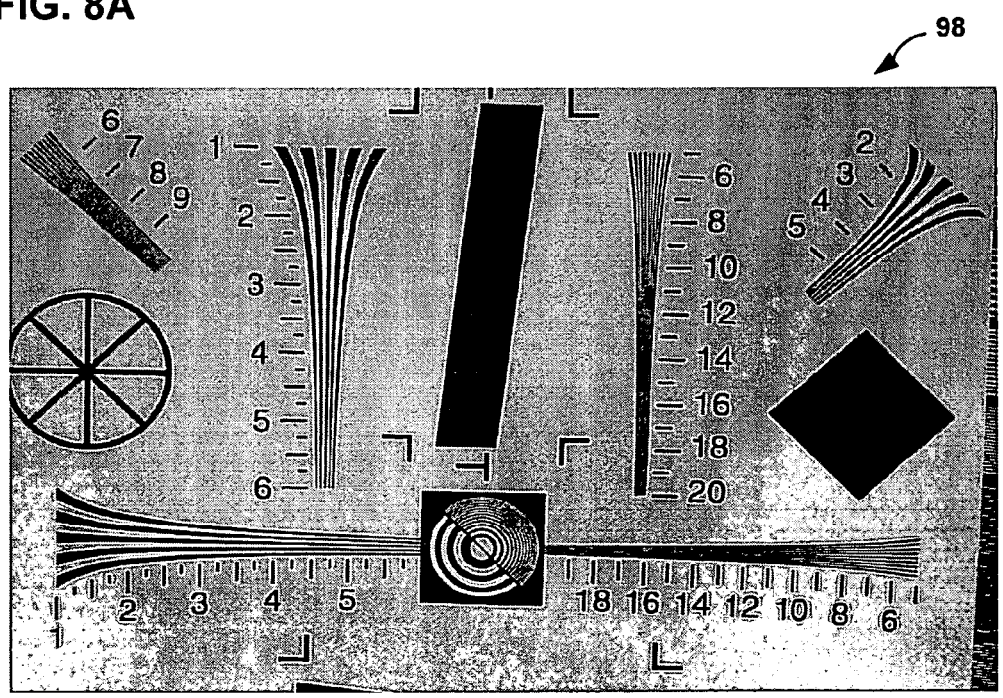

FIGS. 8A, 8B are images illustrating exemplary image information 96 and filtered image information 98, respectively. Image information 96 shown in FIG. 8A may be substantially similar to image information 30A of FIG. 2 in that image sensor 12 may output image information 96 to adaptive spatial image filter 16. Filtered image information 98 of FIG. 8B may be substantially similar to filtered image information 30G in that filtered image information 98 may result from application of adaptive spatial image filter 14 to image information 96. Notably, filtered image information 98 includes a reduced halo effect, similar to halo effect 88 of FIG. 6B. Techniques described above in reference to FIG. 7 can be applied in this instance to reduce any noticeable halo effect. As shown by filtered image information 98, the image represented by filtered image information 98 appears lighter and noticeably clearer. Application of the techniques described herein and as illustrated by filtered image information 98 may allow an image capture device, such as image capture device 10 of FIGS. 1, 2 to apply an adaptive spatial image filter, such as adaptive spatial image filter 14, that noticeably sharpens captured image information. The adaptive spatial image filter applies both smoothing and sharpening in a manner that decreases noise and sharpens the image information despite the inherent limitations of the image sensors, interference from illumination sources, and the like.

The techniques described in this disclosure may be implemented in hardware, software, firmware or any combination thereof. In particular, an encoder or decoder, as described herein, may be realized by any of a variety of hardware, software and firmware components. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some embodiments, the functionality described herein may be provided within dedicated software modules or hardware units configured for encoding and decoding, or incorporated in a combined video encoder-decoder (CODEC).

When implemented in software, the techniques may be realized in part by a computer readable medium comprising program code or instructions that, when executed by a processor, performs one or more of the functions described above. A computer-readable medium storing such program code or instructions may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any combination of such memory or storage media.

Various embodiments of the disclosure have been described. These and other embodiments are within the scope of the following claims.

The invention claimed is:

1. A method comprising:
determining one or more parameter values based on a current exposure level and a current scaling level of image information, wherein determining the one or more parameter values includes determining a horizontal sharpening degree ($k_H$) and a vertical sharpening degree ($k_V$), the horizontal sharpening degree being determined independently of the vertical sharpening degree;
configuring a horizontal sharpening filter based on the horizontal sharpening degree ($k_H$);
configuring a vertical sharpening filter based on the vertical sharpening degree ($k_V$), wherein the configured horizontal sharpening filter is configured independently from the configured vertical sharpening filter;
applying the configured horizontal sharpening filter to at least one channel of the image information to generate horizontally sharpened information; and
applying the configured vertical sharpening filter to the at least one channel of image information to generate vertically sharpened information.

2. The method of claim 1, wherein the current exposure level is an exposure index value indicating an illumination intensity to which an imaging device is exposed during acquisition of the image information, and the current scaling level indicates an amount of upscaling or downscaling applied to the image information.

3. The method of claim 1, wherein determining the one or more parameter values includes:
classifying a range of exposure levels according to a plurality of exposure index values that each are associated with one or more static parameter values;
determining a difference between the current exposure level and the classification; and
interpolating the one or more parameter values from the one or more static parameter values of the classification based on the determination of the difference.

4. The method of claim 1, wherein determining the one or more parameter values includes:
classifying a range of scaling levels according to a plurality of scaling factor index values that each are associated with one or more of static parameter values;
determining a difference between the current scaling level and the classification; and
interpolating the one or more parameter values from one or more static parameter values of the classification based on the determination of the difference.

5. The method of claim 1, wherein determining one or more parameter values includes determining the one or more parameter values based on static parameter values associated with an exposure index value that corresponds to the current exposure level and static parameter values associated with a scaling factor index value that corresponds to the current scaling level.

6. The method of claim 1, further comprising:
configuring a smoothing filter based on the parameter values; and
applying the smoothing filter to the at least one channel of the image information to generate smoothed image information prior to applying the configured horizontal and vertical filters, wherein applying the configured horizontal and vertical sharpening filters includes applying the configured horizontal and vertical sharpening filter to at least one channel of the smoothed image information to generate the horizontally and vertically sharpened image information.

7. The method of claim 6, wherein the parameter values include one or more of a smoothing degree (p), a horizontal sharpening degree ($k_H$), a vertical sharpening degree ($k_V$), a sharpening subtraction threshold ($e_1$), a maximum positive sharpening limit ($e_2$), a maximum negative sharpening limit ($e_3$), a horizontal sharpening filter ($F_H$), and a vertical sharpening filter ($F_V$) parameter values.

8. The method of claim 7,
wherein configuring the smoothing filter includes setting the smoothing degree (p) of the smoothing filter,
wherein configuring the horizontal sharpening filter includes setting the horizontal sharpening degree ($k_H$) of the horizontal sharpening filter, and
wherein configuring the vertical sharpening filter includes setting the vertical sharpening degree ($k_V$) of the vertical sharpening filter.

9. The method of claim 6, wherein applying the configured horizontal and vertical sharpening filters further comprises:
applying the configured horizontal sharpening filter to the at least one channel of the smoothed image information to generate the horizontally sharpened image information;
applying the configured vertical sharpening filter to the at least one channel of the smoothed image information to generate the vertically sharpened image information; and
summing the smoothed image information, the horizontally sharpened image information, and the vertically sharpened image information to generate a filtered image information.

10. The method of claim 9, wherein applying the configured horizontal and vertical sharpening filters further includes:
clamping the horizontally sharpened image information according to a maximum positive sharpening limit ($e_2$) and a maximum negative sharpening limit ($e_3$) included within the parameter values; and
clamping the vertically sharpened image information according to the maximum positive sharpening limit ($e_2$) and the maximum negative sharpening limit ($e_3$).

11. The method of claim 9, wherein applying the configured horizontal and vertical sharpening filters further includes:
subtracting a sharpening subtraction threshold ($e_1$) included within the plurality of parameter values from the horizontal sharpening image information; and
subtracting the sharpening subtraction threshold ($e_1$) from the vertical sharpening image information.

12. The method of claim 1, wherein applying the configured horizontal and vertical sharpening filters includes applying the configured horizontal and vertical sharpening filters to a luminance (Y) channel of the image information, wherein the image information defines the image information according to the YCrCb color space.

13. The method of claim 1, wherein the horizontal sharpening filter comprises a first high pass component and a first low pass component and the vertical sharpening filter comprises a second high pass component and a second low pass component.

14. The method of claim 13, wherein configuring the horizontal sharpening filter includes:
configuring the first low pass component of the horizontal sharpening filter to reduce halo effects by setting a horizontal sharpening filter ($F_H$) parameter value with one or more of the plurality of parameter values; and
configuring the first high pass component of the horizontal sharpening filter to reduce the halo effects by setting a horizontal sharpening filter ($F_H$) parameter value with one or more of the plurality of parameter values.

15. The method of claim 13, wherein configuring the vertical sharpening filter includes:
configuring the second low pass component of the vertical sharpening filter to reduce halo effects by setting a vertical sharpening filter ($F_V$) parameter with one or more of the plurality of parameter values; and
configuring the second high pass component of the vertical sharpening filter to reduce the halo effects by setting a vertical sharpening filter ($F_V$) parameter with one or more of the plurality of parameter values.

16. A device comprising:
an image sensor that captures image information and determines one or more parameter values including a horizontal sharpening degree ($k_H$) and a vertical sharpening degree ($k_V$) based on a current exposure level and a current scaling level of the image information, the horizontal sharpening degree being determined independently from the vertical sharpening degree; and
an adaptive spatial image filter that includes horizontal and vertical sharpening filters, wherein the adaptive spatial image filter configures the horizontal sharpening filter based on the horizontal sharpening degree ($k_H$) and the vertical sharpening filter based on the vertical sharpening degree ($k_V$), wherein the configured horizontal sharpening filter is configured independently from the configured vertical sharpening filter, and applies the configured horizontal sharpening filter to at least one channel of the image information to generate horizontally sharpened information and applies the configured vertical sharpening filter to the at least one channel to generate vertically sharpened image information.

17. The device of claim 16, wherein the current exposure level is an exposure index value indicating an illumination intensity to which an imaging device is exposed during acquisition of the image information, and the current scaling level indicates an amount of upscaling or downscaling applied to the image information.

18. The device of claim 16, wherein the image sensor determines the parameter values by:
classifying a range of exposure levels according to a plurality of exposure index levels that each are associated with a plurality of static parameter values;
determining a difference between the current exposure level and the classification; and
interpolating the one or more parameter values from the one or more static parameter values of the classification based on the determination of the difference.

19. The device of claim 16, wherein the image sensor determines the parameter values by:
classifying a range of scaling levels according to a plurality of scaling factor index values that each are associated with one or more static parameter values;
determining a difference between the current scaling level and the classification; and
interpolating the plurality of parameter values from the one or more static parameter values of the classification based on the determination of the difference.

20. The device of claim 16,
wherein the adaptive spatial image filter further includes a smoothing filter, and
wherein the adaptive spatial image filter further configures the smoothing filter based on the parameter values and applies the smoothing filter to the at least one channel of the image information to generate smoothed image information prior to applying the configured horizontal and vertical filters,
wherein the adaptive spatial image filter applies the configured horizontal and vertical sharpening filters by applying the configured horizontal and vertical sharpening filter to at least one channel of the smoothed image information to generate the filtered image information.

21. The device of claim 20, wherein the parameter values include one or more of a smoothing degree (p), a horizontal sharpening degree ($k_H$), a vertical sharpening degree ($k_V$), a sharpening subtraction threshold ($e_1$), a maximum positive sharpening limit ($e_2$), a maximum negative sharpening limit ($e_3$), a horizontal sharpening filter ($F_H$), and a vertical sharpening filter ($F_V$) parameter values.

22. The device of claim 21, wherein the adaptive spatial image filter sets the smoothing degree (p) of the smoothing filter, sets the horizontal sharpening degree ($k_H$) of the horizontal sharpening filter, and sets the vertical sharpening degree ($k_V$) of the vertical sharpening filter.

23. The device of claim 21, wherein the adaptive spatial image filter:

applies the configured horizontal sharpening filter to the at least one channel of the smoothed image information to generate the horizontally sharpened image information;
applies the configured vertical sharpening filter to the at least one channel of the smoothed image information to generate the vertically sharpened image information;
sums the smoothed image information, the horizontally sharpened image information, and the vertically sharpened image information to generate a filtered image information.

24. The device of claim 23, wherein the adaptive spatial image filter:
clamps the horizontally sharpened image information according to a maximum positive sharpening limit ($e_2$) and a maximum negative sharpening limit ($e_3$) included within the plurality of parameter values; and
clamps the vertically sharpened image information according to the maximum positive sharpening limit ($e_2$) and the maximum negative sharpening limit ($e_3$).

25. The device of claim 24, wherein the adaptive spatial image filter:
subtracts a sharpening subtraction threshold ($e_1$) included within the plurality of parameter values from the horizontal sharpening image information; and
subtracts the sharpening subtraction threshold ($e_1$) from the vertical sharpening image information.

26. The device of claim 16, wherein the adaptive spatial image filter applies the configured horizontal and vertical sharpening filters to the luminance (Y) channel of the image information, wherein the image information is defined according to the YCrCb color space.

27. The device of 16, wherein the horizontal sharpening filter has a first high pass component and a first low pass component and the vertical sharpening filter has a second high pass component and a second low pass component to generate the filtered image information.

28. The device of claim 27, wherein the adaptive spatial image filter:
configures the first low pass component of the horizontal sharpening filter to reduce halo effects by setting a horizontal sharpening filter ($F_H$) parameter value with one or more of the plurality of parameter values; and
configures the first high pass component of the horizontal sharpening filter to reduce the halo effects by setting a horizontal sharpening filter ($F_H$) parameter value with one or more of the plurality of parameter values.

29. The device of claim 27, wherein the adaptive spatial image filter:
configures the second low pass component of the vertical sharpening filter to reduce halo effects by setting a vertical sharpening filter ($F_V$) parameter with one or more of the plurality of parameter values; and
configures the second high pass component of the vertical sharpening filter to reduce the halo effects by setting a vertical sharpening filter ($F_V$) parameter with one or more of the plurality of parameter values.

30. A non-transitory computer-readable medium comprising instructions to cause a processor to:
determine one or more parameter values based on a current exposure level and a current scaling level of image information, wherein the one or more parameter values include a horizontal sharpening degree ($k_H$) and a vertical sharpening degree ($k_V$), the horizontal sharpening degree being determined independently from the vertical sharpening degree;

configure a horizontal sharpening filter based on the horizontal sharpening degree ($k_H$);
configure a vertical sharpening filter based on the vertical sharpening degree ($k_V$), wherein the configured horizontal sharpening filter is configured independently from the configured vertical sharpening filter;
apply the configured horizontal sharpening filter to at least one channel of the image information to generate horizontally sharpened information; and
apply the configured vertical sharpening filter to the at least one channel of the image information to generate vertically sharpened image information.

31. The non-transitory computer-readable medium of claim 30, wherein the current exposure level is an exposure index value indicating an illumination intensity to which an imaging device is exposed during acquisition of the image information, and the current scaling level indicates an amount of upscaling or downscaling applied to the image information.

32. The non-transitory computer-readable medium of claim 30, wherein the instructions cause the processor to:
classify a range of exposure levels according to a plurality of exposure index values that each are associated with one or more static parameter values;
determine a difference between the current exposure level and the classification; and
interpolate the one or more parameter values from the one or more static parameter values of the classification based on the determination of the difference.

33. The non-transitory computer-readable medium of claim 30, wherein the instructions cause the processor to:
classify a range of scaling levels according to a plurality of scaling factor index values that each are associated with one or more of static parameter values;
determine a difference between the current scaling level and the classification; and
interpolate the one or more parameter values from one or more static parameter values of the classification based on the determination of the difference.

34. The non-transitory computer-readable medium of claim 30, wherein the instructions cause the processor to determine the one or more parameter values based on static parameter values associated with an exposure index value that corresponds to the current exposure level and static parameter values associated with a scaling factor index value that corresponds to the current scaling level.

35. The non-transitory computer-readable medium of claim 30, wherein the instructions cause the processor to configure a smoothing filter based on the parameter values, and apply the smoothing filter to the at least one channel of the image information to generate smoothed image information prior to applying the configured horizontal and vertical filters, wherein applying the configured horizontal and vertical sharpening filters includes applying the configured horizontal and vertical sharpening filter to at least one channel of the smoothed image information to generate the filtered image information.

36. The non-transitory computer-readable medium of claim 35, wherein the parameter values include one or more of a smoothing degree (p), a horizontal sharpening degree ($k_H$), a vertical sharpening degree ($k_V$), a sharpening subtraction threshold ($e_1$), a maximum positive sharpening limit ($e_2$), a maximum negative sharpening limit ($e_3$), a horizontal sharpening filter ($F_H$), and a vertical sharpening filter ($F_V$) parameter values.

37. The non-transitory computer-readable medium of claim 36, wherein the instructions cause the processor to:
set the smoothing degree (p) of the smoothing filter,
set the horizontal sharpening degree ($k_H$) of the horizontal sharpening filter, and
set the vertical sharpening degree ($k_V$) of the vertical sharpening filter.

38. The non-transitory computer-readable medium of claim 35, wherein the instructions cause the processor to:
apply the configured horizontal sharpening filter to the at least one channel of the smoothed image information to generate the horizontally sharpened image information;
apply the configured vertical sharpening filter to the at least one channel of the smoothed image information to generate the vertically sharpened image information; and
sum the smoothed image information, the horizontally sharpened image information, and the vertically sharpened image information to generate the filtered image information.

39. The non-transitory computer-readable medium of claim 38, wherein the instructions cause the processor to:
clamp the horizontally sharpened image information according to a maximum positive sharpening limit ($e_2$) and a maximum negative sharpening limit ($e_3$) included within the parameter values; and
clamp the vertically sharpened image information according to the maximum positive sharpening limit ($e_2$) and the maximum negative sharpening limit ($e_3$).

40. The non-transitory computer-readable medium of claim 38, wherein the instructions cause the processor to:
subtract a sharpening subtraction threshold ($e_1$) included within the plurality of parameter values from the horizontal sharpening image information; and
subtract the sharpening subtraction threshold ($e_1$) from the vertical sharpening image information.

41. The computer-readable medium of claim 30, wherein the instructions cause the processor to apply the configured horizontal and vertical sharpening filters to a luminance (Y) channel of the image information, wherein the image information defines the image information according to the YCrCb color space.

42. The computer-readable medium of claim 30, wherein the horizontal sharpening filter comprises a first high pass component and a first low pass component and the vertical sharpening filter comprises a second high pass component and a second low pass component.

43. The computer-readable medium of claim 42, wherein the instructions cause the processor to:
configure the first low pass component of the horizontal sharpening filter to reduce halo effects by setting a horizontal sharpening filter ($F_H$) parameter value with one or more of the plurality of parameter values; and
configure the first high pass component of the horizontal sharpening filter to reduce the halo effects by setting a horizontal sharpening filter ($F_H$) parameter value with one or more of the plurality of parameter values.

44. The computer-readable medium of claim 42, wherein the instructions cause the processor to:
configure the second low pass component of the vertical sharpening filter to reduce halo effects by setting a vertical sharpening filter ($F_V$) parameter with one or more of the plurality of parameter values; and
configure the second high pass component of the vertical sharpening filter to reduce the halo effects by setting a vertical sharpening filter ($F_V$) parameter with one or more of the plurality of parameter values.

45. A device comprising:
means for determining one or more parameter values based on a current exposure level and a current scaling level of image information, the one or more parameter values including a horizontal sharpening degree ($k_H$) and a vertical sharpening degree ($k_V$), the horizontal sharpening degree being determined independently from the vertical sharpening degree;

means for configuring a horizontal sharpening filter based on the horizontal sharpening degree ($k_H$);

means for configuring a vertical sharpening filter based on the vertical sharpening degree ($k_V$), wherein the configured horizontal sharpening filter is configured independently from the configured vertical sharpening filter;

means for applying the configured horizontal sharpening filter to at least one channel of the image information to generate horizontally sharpened information; and means for applying the configured vertical sharpening filter to the at least one channel of the image information to generate vertically sharpened image information.

46. The device of claim 45, wherein the current exposure level is an exposure index value indicating an illumination intensity to which an imaging device is exposed during acquisition of the image information, and the current scaling level indicates an amount of upscaling or downscaling applied to the image information.

47. The device of claim 45, wherein the means for determining the one or more parameter values includes:

means for classifying a range of exposure levels according to a plurality of exposure index values that each are associated with one or more static parameter values;

means for determining a difference between the current exposure level and the classification; and means for interpolating the one or more parameter values from the one or more static parameter values of the classification based on the determination of the difference.

48. The device of claim 45, wherein the means for determining the parameter values includes:

means for classifying a range of scaling levels according to a plurality of scaling factor index values that each are associated with one or more of static parameter values;

means for determining a difference between the current scaling level and the classification; and means for interpolating the one or more parameter values from one or more static parameter values of the classification based on the determination of the difference.

49. The device of claim 45, further comprising:

means for configuring a smoothing filter based on the smoothing degree (p); and means for applying the smoothing filter to the at least one channel of the image information to generate smoothed image information prior to applying the configured horizontal and vertical filters, wherein the means for applying the configured horizontal and vertical sharpening filters includes means for applying the configured horizontal and vertical sharpening filter to at least one channel of the smoothed image information to generate the filtered image information.

50. The device of claim 49, wherein the parameter values include one or more of a smoothing degree (p), a horizontal sharpening degree ($k_H$), a vertical sharpening degree ($k_V$), a sharpening subtraction threshold ($e_1$), a maximum positive sharpening limit ($e_2$), a maximum negative sharpening limit ($e_3$), a horizontal sharpening filter ($F_H$), and a vertical sharpening filter ($F_V$) parameter values.

* * * * *